Figure 1:
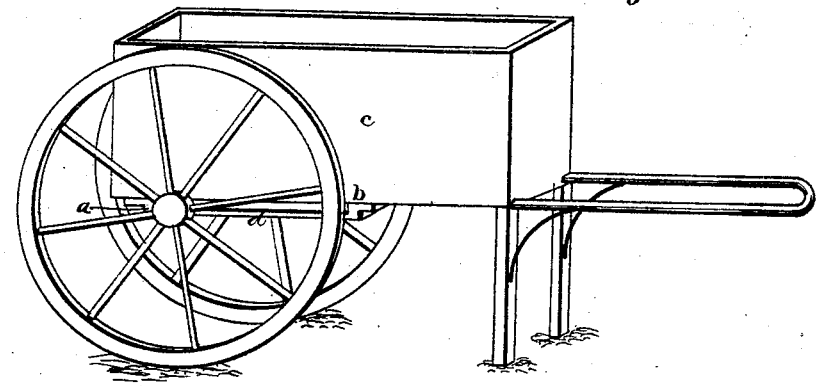
Figure 2:
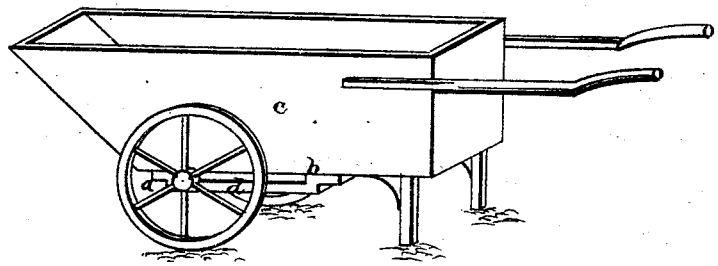

J. M. & J. L. JONES.
Trucks.

No. 147,007.

Patented Feb. 3, 1874.

Witnesses,
Ed. Taylor
Talbott Jones.

Inventors,
2nd James Laurens Jones
1st Joseph Matthias Jones

UNITED STATES PATENT OFFICE.

JOSEPH M. JONES, OF PARIS, AND JAMES L. JONES, OF LEXINGTON, KY.

IMPROVEMENT IN TRUCKS.

Specification forming part of Letters Patent No. 147,007, dated February 3, 1874; application filed November 28, 1873.

*To all whom it may concern:*

Be it known that we, JOSEPH MATTHIAS JONES, of Paris, Kentucky, and JAMES LAWRENCE JONES, of Lexington, Kentucky, have invented an Improvement in Trucks and Hand-Carts, of which the following is a specification:

Our invention relates to an improvement in hand and truck carts; and it consists in securing to the under side of the bed of the cart, on each side, a slotted guide, in which the axle of the wheels may freely slide back and forth, so as to shift the weight of the load directly upon the wheels.

The accompanying drawings represent two carts of different construction embodying our invention.

$c$ represents the body of a coal or hand cart, of the usual construction, having secured to its under side two guides, $d$, slotted from $a$ to $b$, in which the axle of the two wheels may slide freely back and forth.

When the cart is ready to be loaded, the axle may be moved forward to the end $a$ by drawing back on the handles, but as the operator pushes forward the axles slide backward to the end $b$ of the slot, when the weight of the load will come directly upon the wheels, so that the operator will simply have to push forward in moving the cart, instead of also having to carry a part of the load, as the carts are usually constructed.

The invention is an improvement upon the patent granted to us October 21, 1873.

Having thus described our invention, we claim—

A hand-cart having a guide, $d$, secured to each side of the bottom of the body $c$, so that the axle of the wheels can be shifted back and forth, so as to transfer the weight of the load directly upon the wheels, substantially as shown and described.

JOSEPH MATTHIAS JONES. [L. S.]
  JAMES LAWRENCE JONES. [L. S.]

Witnesses:
  ED. TAYLOR,
  WILLIAM TALBOTT JONES.